United States Patent [19]

Hamacher

[11] 4,430,693

[45] Feb. 7, 1984

[54] ILLUMINATING DEVICE FOR UNDERGROUND MINING

[76] Inventor: Martin Hamacher, Westerholter Strasse 791, 4352 Herten, Fed. Rep. of Germany

[21] Appl. No.: 329,511

[22] Filed: Dec. 10, 1981

[30] Foreign Application Priority Data

Dec. 12, 1980 [DE] Fed. Rep. of Germany ....... 3046834

[51] Int. Cl.[3] .............................................. B60Q 1/00

[52] U.S. Cl. ........................................ 362/61; 299/43; 362/64; 362/223; 362/369; 362/390

[58] Field of Search ...................... 299/43; 362/61, 64, 362/390, 164, 253, 255, 274, 369, 376, 377, 378, 217, 223

[56] References Cited

U.S. PATENT DOCUMENTS 4,042,819 8/1977 Dacal .............................. 362/376 X
4,158,880 6/1979 McJunkin ............................ 362/164
4,229,780 10/1980 Nelson ............................ 362/376 X
4,247,884 1/1981 McJunkin et al. .............. 362/260 X
4,282,564 8/1981 McJunkin et al. .................. 362/164
4,312,028 1/1982 Hamacher ........................... 362/369
4,352,148 9/1982 McJunkin et al. .................... 362/61

FOREIGN PATENT DOCUMENTS 974823 5/1961 Fed. Rep. of Germany ........ 299/43

*Primary Examiner*—David H. Brown
*Attorney, Agent, or Firm*—Karl F. Ross

[57] ABSTRACT

A device for illuminating a tunnel of an underground mine being worked by an excavating machine comprises a lamp housing with a light-transmissive vaulted cover snap-fitted thereto and with a fluorescent tube horizontally disposed inside that cover, the housing being suspended by a resilient mounting from a horizontal flange of a wall member of the machine shielding it from the mine face. The cover penetrates the flange and raises the tube to a level at which its light radiates upward as well as horizontally toward and away from the mine face; a flared peripheral zone of the cover enables the housing to be repressed against the spring force of its mounting by an object passing across the flange so that the top of the housing lies flush with the flange surface.

7 Claims, 5 Drawing Figures

ILLUMINATING DEVICE FOR UNDERGROUND MINING

CROSS-REFERENCE TO RELATED APPLICATION

This application contains subject matter disclosed in my copending application Ser. No. 238,421 filed Feb. 26, 1981.

FIELD OF THE INVENTION

My present invention relates to a device to be used in underground mining for the illumination of tunnels, stopes and the like.

BACKGROUND OF THE INVENTION

In my above-identified copending application I have disclosed a mining lamp with an elongate bulb in the form of a fluroescent tube mounted on a base plate and enveloped by a light-transmissive vaulted cover which is snap-fitted onto that plate so as to form an airtight seal therewith while being readily detachable to enable replacement of the bulb. Such a lamp, when horizontally positioned, radiates light in all directions above the plane of its base plate and can therefore be used to illuminate the roof and the walls of an underground room.

When a tunnel is being driven forward by automatic excavating equipment on a mine face, continuous illumination of that mine face is desirable. At the same time it becomes necessary to protect the lamp or lamps illuminating the mine face from lumps of solid matter, such as rock fragments, thrown backward by the excavating tool onto a conveyor or into a channel serving for the transportation of these lumps to a gallery paralleling the direction of advance.

OBJECTS OF THE INVENTION

An important object of my present invention, therefore, is to provide means for supporting an illuminating device—preferably a lamp of the type disclosed in my above-identified copending application—in an underground mine at a location enabling effective illumination of a mine face being worked on while shielding that device against oncoming rock fragments or the like.

A more particular object is to provide a mounting for such a device enabling its most effective use in illuminating not only the mine face but also the roof and sides of a tunnel.

SUMMARY OF THE INVENTION

I attain these objects, in accordance with my present invention, by the provision of a lamp carried on a rearwardly bent upper flange of a wall member which forms a rear boundary of a trough for the transportation of lumps detached from a mine face by excavating tool means. A lamp housing is suspended from this flange behind the wall member while a light-transmissive vaulted cover rises from the housing and penetrates an aperture of the flange so that a bulb inside that cover lights at least the upper part of the tunnel. A cable serving for the energization of the electric light bulb passes through the housing to an external power supply.

In conformity with the disclosure of my above-identified copending application, the cover can be snap-fitted onto the top of the housing acting as a base plate therefor.

Even if the cover is flush with the upper surface of the wall flange penetrated thereby, a bulb disposed close to the top of that cover will be able to illuminate part of the mine face. If the cover and the bulb are raised above the flange surface, the area of illumination is increased; this, however, entails the risk of damage to the lamp by solid objects passing over the flange. In order to minimize that risk while still providing maximum illumination, I prefer to provide the supporting flange with resilient mounting means normally holding the housing elevated close to the flange, thus in a position in which the cover and the light bulb project above the latter, the cover being repressible against the force of the mounting means into a position flush with the flange. With suitable flaring of a peripheral zone of the cover, such repression into a fully shielded position may take place when a flying rock fragment strikes the cover sideways as well as when a chunk of overburden drops from the roof onto the lamp and the flange.

BRIEF DESCRIPTION OF THE DRAWING

The above and other features of my invention will now be described in detail with reference to the accompanying drawing in which.

SPECIFIC DESCRIPTION

Figure 1:
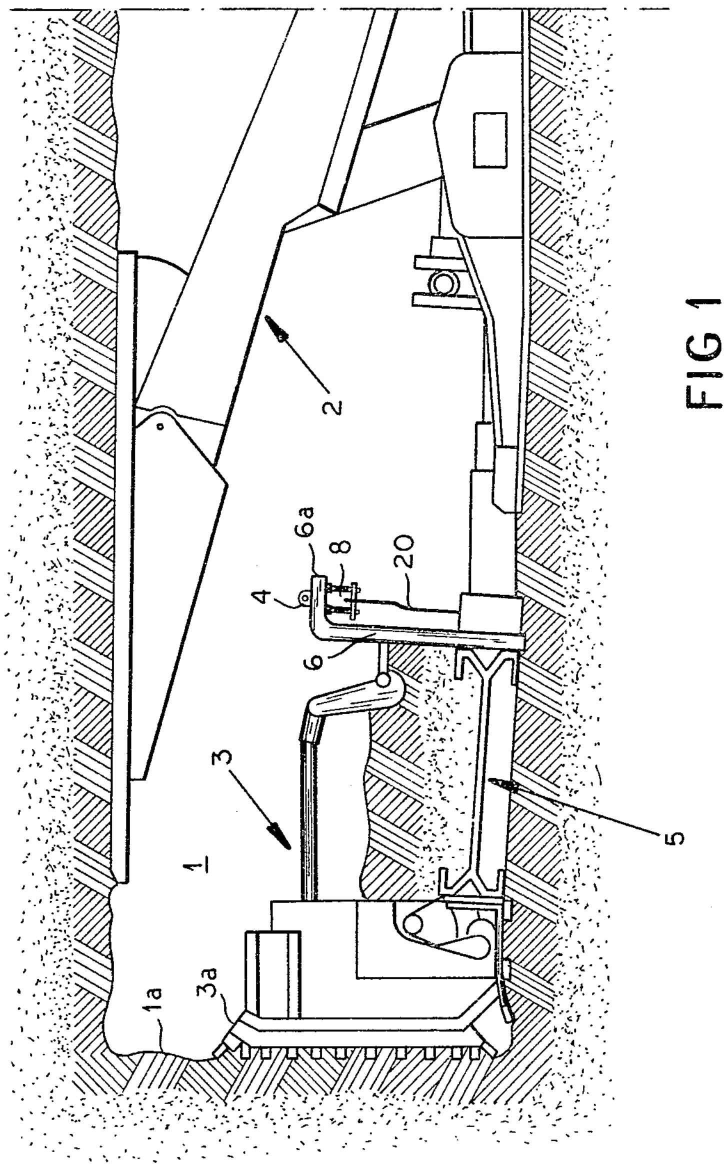
FIG. 1 is a cross-sectional view of a tunnel in an underground mine, showing an excavating machine equipped with an illuminating device according to my invention.
Figure 2:
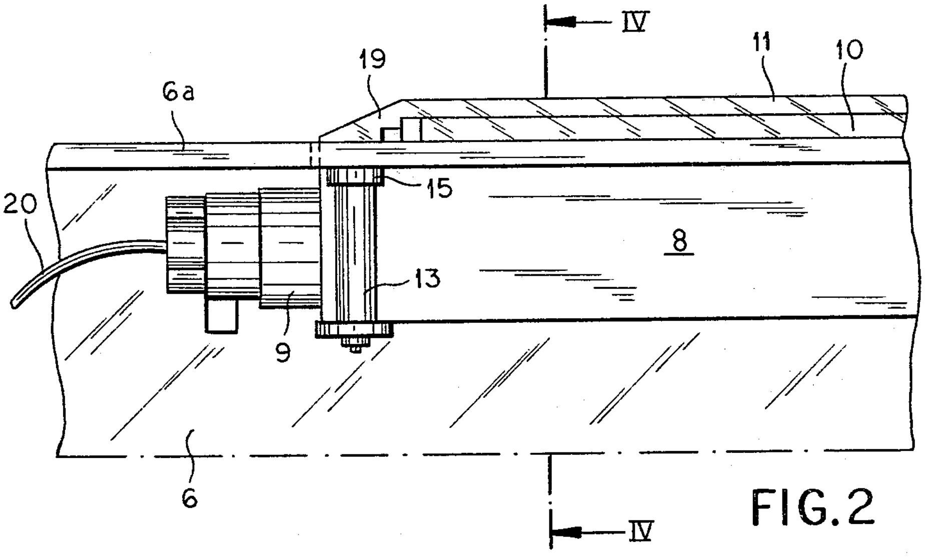
FIG. 2 is a fragmentary side-elevational view of the illuminating device of FIG. 1 and of a support therefor, drawn to a larger scale.
Figure 3:
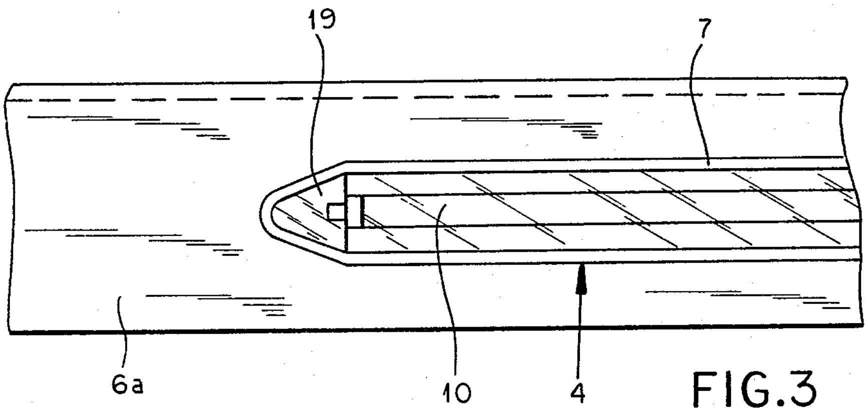
FIG. 3 is a top view of the assembly shown in FIG. 2.
Figure 4:
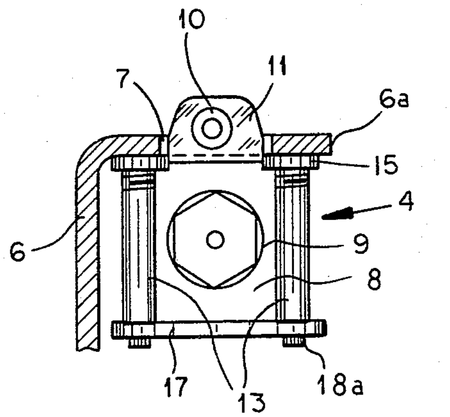
FIG. 4 is a cross-sectional view taken on the line IV—IV of FIG. 2.

FIG. 1 shows a tunnel 1 with a mine face being worked by an excavating machine 3 which is conventionally linked with a roof-supporting structure 2 and has a wall member 6 forming a rear boundary of a trough that serves for the transportation of lumps of solid matter (e.g. coal) by a transverse conveyor 5. Wall member 6 has a rearwardly bent upper flange *6a* on which, as more fully described hereinafter with reference to the subsequent Figures, a series of lamps 4 of the type disclosed in my copending application Ser. No. 238,421 are supported. Each lamp 4 has a housing 8 which is suspended from flange *6a* and is shielded by member 6 from a mine face *1a*, the latter being worked on by an excavating tool *3a* of machine 3. A cable 20 extends from housing 8 to a nonillustrated power supply such as an electric battery.

The excavating tool *3a*, here shown as a rotary shearing head, could also be an auger extending along the mine face *1a*, e.g. as disclosed in U.S. Pat. No. 3,524,680. In such a case the conveyor 5 would be omitted and the wall member 6 would be a so-called scavenger board trailing the auger.

As more clearly shown in FIGS. 2–5, lamp housing 8 is of elongate prismatic shape and is straddled at each end by a pair of hollow posts 13 to whose lower ends a cross-bar 17 is attached by bolts 18, the housing resting on these cross-bars. A vaulted transparent cover 11 of plastic material is snap-fitted, with the aid of complementary formations as described in my copending application, onto a raised platform at the top of housing 8 and envelops a light bulb 10 in the form of a fluroescent or cold-cathode tube. An end of housing 8 has a fitting 9 through which the cable 20 extends to the electrodes of that light bulb.

Figure 5:
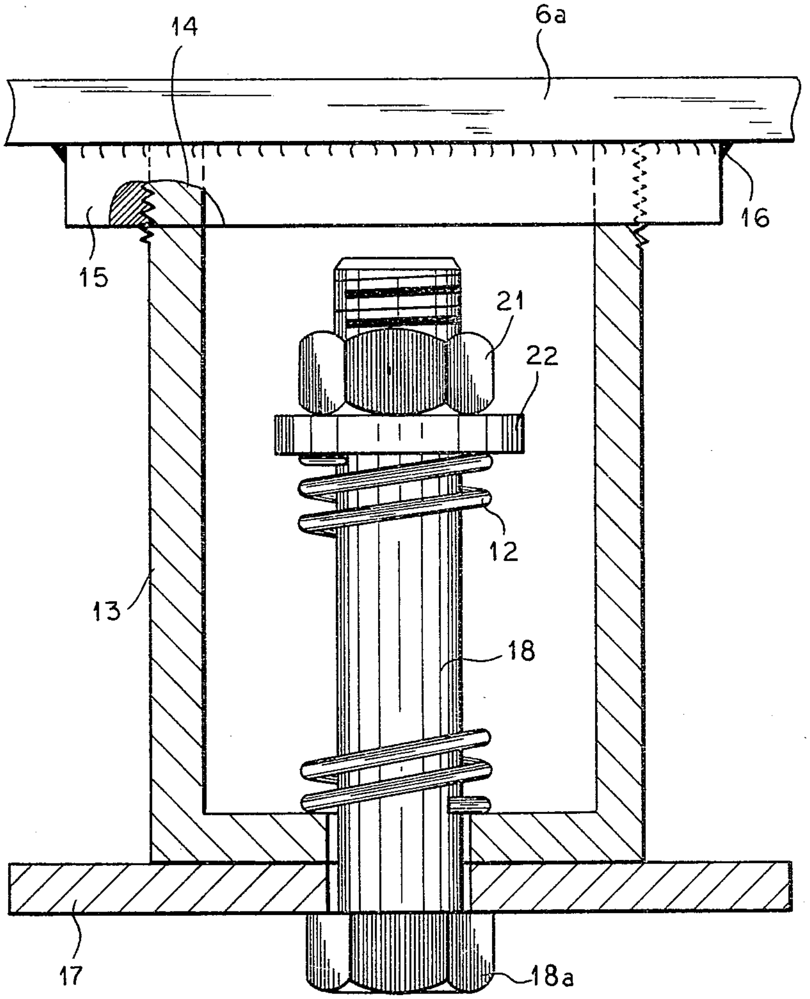
FIG. 5 is a cross-sectional view, drawn to a still larger scale, of a mounting member for the device shown in FIGS. 1–4.

As best seen in FIG. 5, each post 13 is formed at its top with external threads 14 by which it is screwed into a nut 15 welded at 16 to the flange 6*a*. The bolt 18 associated with each post 13 has a head 18*a* holding up the associated cross-bar 17 and is engaged inside the post by a nut 21 which bears through a washer 22 upon a coil spring 12 with progressive compression characteristic surrounding the shank of the bolt. Cover 11, penetrating an aperture 7 of flange 6*a*, is provided on all sides with a flared peripheral zone 19 which deflects oncoming rock fragments and, in the event of a strong impact, gives rise to a downward force which depresses the lamp 4 into a partly or fully withdrawn position against the resistance of mounting springs 12. The lamps could also be manually withdrawn into a sheltered position, e.g. with the aid of weights placed on top, in situations when their full illuminating capacity is not needed and the risk of collision is great, e.g. during passage of the equipment through galleries, stopes or tunnels without roof support.

I claim:

1. In an excavating machine for underground mining having tool means for breaking clumps of solid matter of a mine face, and a wall member forming a rear boundary of a trough for the transportation of said lumps, the combination therewith of a lamp carried on a rearwardly bent upper flange of said wall member, said lamp comprising a housing suspended from said flange behind said wall member, a light-transmissive vaulted cover rising from said housing and penetrating an aperture of said flange, and an electric light bulb inside said cover provided with a cable passing through said housing to an external power supply.

2. The combination defined in claim 1 wherein said cover is removably fitted onto the top of said housing.

3. The combination defined in claim 1 or 2 wherein said flange is provided with resilient mounting means normally holding said housing elevated close to said flange with said cover and said light bulb projecting above said flange, said cover being repressible against the resiliency of said mounting means into a position flush with said flange.

4. The combination defined in claim 3 wherein said cover has a flared peripheral zone facilitating its depression by objects crossing said flange.

5. The combination defined in claim 3 wherein said mounting means comprises a plurality of hollow posts depending from said flange, support means underlying said housing and extending below said posts, bolts engaging said support means and extending into said posts, and springs in said posts bearing upon said bolts to urge said support against the lower ends of said posts.

6. The combnation defined in claim 5 wherein said flange is provided on its underside with a plurality of nuts welded thereto, said posts having threaded upper extremities respectively screwed into said nuts.

7. The combination defined in claim 5 wherein said posts are disposed in pairs on opposite sides of said housing, said support means comprising a bar extending between the lower ends of each pair.

* * * * *